(No Model.)
J. JENNINGS.
SWINGING AND SLIDING GATE.
No. 434,510. Patented Aug. 19, 1890.
Fig. 1.
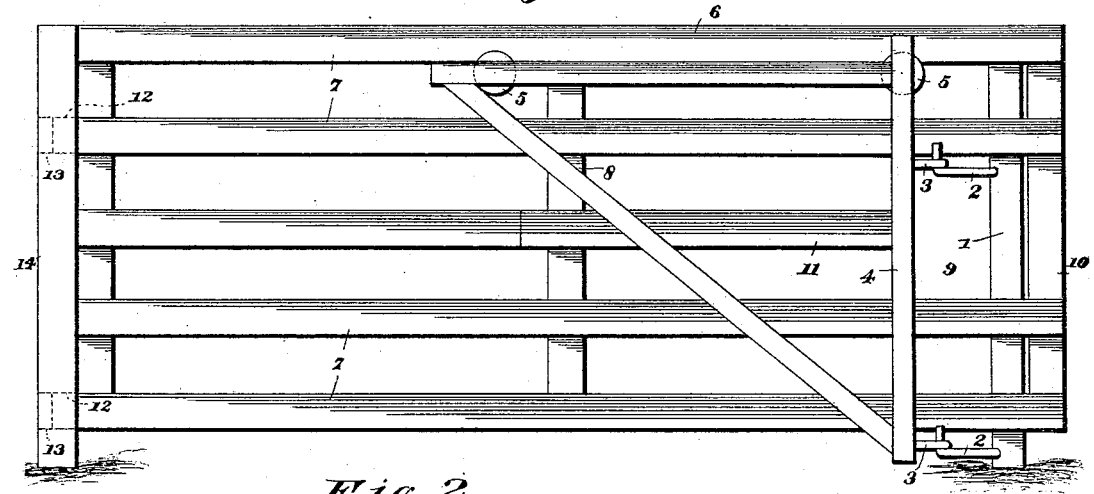
Fig. 2.
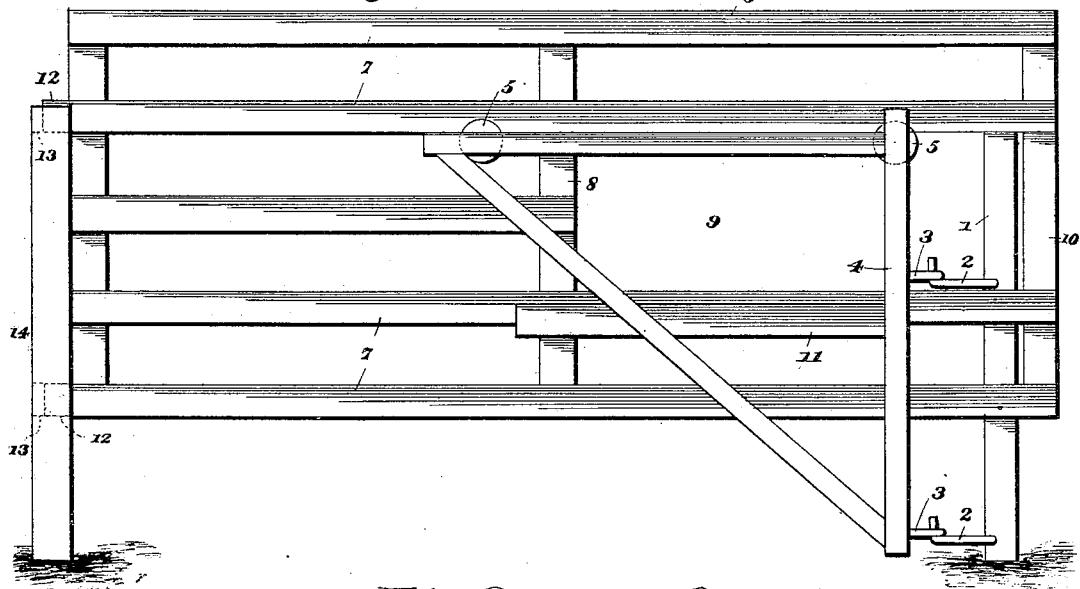
Fig. 3.
Witnesses
J. M. Withers
H. F. Riley
Inventor.
John Jennings,
By his Attorneys
C. A. Snow & Co.

UNITED STATES PATENT OFFICE.

JOHN JENNINGS, OF HILLSDALE, MICHIGAN.

SWINGING AND SLIDING GATE.

SPECIFICATION forming part of Letters Patent No. 434,510, dated August 19, 1890.

Application filed December 3, 1889. Serial No. 332,441. (No model.)

*To all whom it may concern:*

Be it known that I, JOHN JENNINGS, a citizen of the United States, residing at Hillsdale, in the county of Hillsdale and State of Michigan, have invented a new and useful Swinging and Sliding Gate, of which the following is a specification.

The invention relates to improvements in swinging and sliding gates.

The object of the present invention is to provide a sliding and swinging gate of simple and inexpensive construction, adapted to be elevated without removing the hanger-frame to permit the passage of small animals, such as sheep and hogs.

The invention consists in the construction, novel combination, and arrangement of parts, hereinafter fully described, illustrated in the accompanying drawings, and pointed out in the claim hereto appended.

In the drawings, Figure 1 is a side elevation of a gate constructed in accordance with the invention, showing it closed. Fig. 2 is a similar view showing the gate elevated. Fig. 3 is a detail view of a hanger.

Referring to the accompanying drawings, 1 designates the hinge-post, which is provided with pintles 2, that engage suitable eyes 3 of a hanger 4, whereby the hanger is hinged to the post 1. The hanger consists of a triangular frame, and is provided at opposite ends of its top bar with rollers 5 upon which the gate 6 slides. When it is desired to open the gate, it is moved backward upon the rollers and the hanger is then swung upon its hinges in the ordinary manner.

The gate 6 is constructed of longitudinal bars 7, and the center one extends from the front of the gate to the central vertical post 8, leaving an open space 9 between the center post and the rear post 10. By this construction the gate, which normally slides upon the top bar, can be elevated and made to slide upon the second bar without coming in contact with the upper hinge or pintle and eye, thereby obviating the necessity of removing the hanger-frame when it is desired to elevate the gate upon the rollers.

In order to close the opening 9 of the gate, the hanger 4 is provided with a horizontal bar 11, which forms an extension of the center bar of the gate, and closes said opening when the gate is shut and in its normal position.

The front of the gate 6 is provided with projections 12, which are preferably continuations of the bars of the gate, and which engage suitable recesses 13 of a latch-post 14 and hold the gate in its closed position.

Having thus described my invention, what I claim is—

The combination, in a sliding and swinging gate, of the hinge-post, the triangular hanger having a space between it and the hinge-post, and provided at its top with rollers 5, arranged within the posts of the gate, the gate having one of its horizontal bars extending only partially across the gate, and providing the opening 9 to receive one of the hinges and to permit the gate to be elevated without necessitating the removal of the hanger, and the horizontal bar 11, secured to the hanger and adapted to form a continuation of the gate when the latter is in its closed position, and to close the opening 9 and complete the gate, substantially as described.

In testimony that I claim the foregoing as my own I have hereto affixed my signature in presence of two witnesses.

JOHN JENNINGS.

Witnesses:
J. C. WHITNEY,
IRA B. CARD.